(12) United States Patent
Mangini et al.

(10) Patent No.: US 8,271,902 B1
(45) Date of Patent: Sep. 18, 2012

(54) COMMUNICATION OF EMOTIONS WITH DATA

(75) Inventors: Andrea Mangini, Santa Cruz, CA (US); Leah Lin, Palo Alto, CA (US); Marilyn Shade, Menlo Park, CA (US); Satoe Haile, San Francisco, CA (US); Mio Tatemichi, Tokyo (JP)

(73) Assignee: Adobe Systems Incorporated, San Jose, CA (US)

( * ) Notice: Subject to any disclaimer, the term of this patent is extended or adjusted under 35 U.S.C. 154(b) by 653 days.

(21) Appl. No.: 11/490,780

(22) Filed: Jul. 20, 2006

(51) Int. Cl.
*G06F 3/048* (2006.01)

(52) U.S. Cl. ........ 715/834; 715/839; 715/764; 715/835; 715/763

(58) Field of Classification Search .................. 715/834, 715/835, 839, 763–764
See application file for complete search history.

(56) References Cited

U.S. PATENT DOCUMENTS

| | | | | |
|---|---|---|---|---|
| 5,524,196 A * | 6/1996 | Blades | ........................ | 715/834 |
| 5,732,232 A * | 3/1998 | Brush et al. | ................... | 715/751 |
| 5,987,415 A * | 11/1999 | Breese et al. | ................ | 704/270 |
| 6,021,313 A * | 2/2000 | Koga | ........................ | 340/7.56 |
| 6,064,383 A * | 5/2000 | Skelly | ........................ | 715/758 |
| 6,208,342 B1 * | 3/2001 | Mugura et al. | ............... | 715/810 |
| 6,434,604 B1 * | 8/2002 | Harada et al. | ................ | 709/207 |
| 6,629,793 B1 * | 10/2003 | Miller | ........................... | 400/472 |
| 6,692,359 B1 | 2/2004 | Williams et al. | | |
| 6,987,991 B2 * | 1/2006 | Nelson | .......................... | 455/566 |
| 6,990,452 B1 | 1/2006 | Ostermann et al. | | |
| 7,058,903 B1 * | 6/2006 | Jonach et al. | ................. | 715/834 |
| 7,089,504 B1 * | 8/2006 | Froloff | ............................ | 715/839 |
| 7,203,759 B1 | 4/2007 | Ostermann et al. | | |
| 7,286,115 B2 * | 10/2007 | Longe et al. | .................. | 345/168 |
| 7,343,561 B1 * | 3/2008 | Stochosky et al. | ............ | 715/758 |
| 7,434,176 B1 * | 10/2008 | Froloff | ............................ | 715/839 |
| 7,484,176 B2 * | 1/2009 | Blattner et al. | ............... | 715/758 |
| 2005/0156873 A1 | 7/2005 | Walter et al. | | |
| 2005/0163379 A1 | 7/2005 | Zimmermann | | |
| 2005/0181777 A1 | 8/2005 | Kim | | |
| 2005/0183012 A1 * | 8/2005 | Petro et al. | .................... | 715/713 |
| 2005/0216568 A1 * | 9/2005 | Walkush et al. | .............. | 709/207 |
| 2006/0015560 A1 | 1/2006 | Macauley et al. | | |
| 2006/0015812 A1 | 1/2006 | Cunningham et al. | | |
| 2007/0266090 A1 * | 11/2007 | Len | ................................ | 709/204 |

OTHER PUBLICATIONS

J. A. Russell, A circumplex model of affect. Journal of Personality and Social Psychology, 39: 1161-1178, 1980/.*

* cited by examiner

*Primary Examiner* — Tadeese Hailu
*Assistant Examiner* — Darrin Hope
(74) *Attorney, Agent, or Firm* — Robert C. Kowert; Meyertons, Hood, Kivlin, Kowert & Goetzel, P.C.

(57) ABSTRACT

A method for communicating emotions with data is provided. Here, a selection of a graphic image configured to convey an emotion is received. The graphic image is selected with a rotatable dial interface. After receipt, the graphic image is associated with a plurality of data and the graphic image is displayed with the plurality of data.

14 Claims, 10 Drawing Sheets

COMMUNICATION OF EMOTIONS WITH DATA

FIELD OF THE INVENTION

The present invention relates generally to software and, more particularly, to communicating emotions with data.

BACKGROUND

Many emotional aspects of communication (e.g., tone, body language, inflection, and other emotional aspects) are missing in electronic communications. For example, text messages communicated with instant messaging applications may lack the emotional information that may have otherwise been communicated though emotional aspects such as body language and facial expressions. Without emotional information, recipients of electronic communications may misinterpret the electronic communications.

An approach to communicate emotions with electronic communications is the use of emoticons. In general, an emoticon is a sequence of alphanumeric characters that are intended to convey an emotion. For example, the alphanumeric characters may represent a human facial expression that are intended to convey an emotion. Examples of human facial expressions include alphanumeric characters ":-)" that are intended to convey a smile, the alphanumeric characters ":-(" that are intended to convey a frown, and the alphanumeric characters ":-o" that are intended to convey shock. The emoticons may be added to electronic communications (e.g., at the end of a sentence) to provide emotional context.

A drawback of emoticons is that the emoticons cannot convey a large range of emotions because the emoticons are limited by the alphanumeric characters. For example, emoticons cannot be used to differentiate between various degrees of happiness (e.g., happy, slightly happy, very happy, and extremely happy) because, for example, the fine subtleties of various smiles cannot be defined by alphanumeric characters. Further, emoticons are limited to text based messages because emoticons are based on alphanumeric characters. Thus, for example, emoticons cannot be used with electronic communications such as photographs, diagrams, and forms.

Additionally, program applications do not have cues to prompt a user to create emoticons and do not provide a graphical interface to create emoticons. Users therefore must memorize the sequence of alphanumeric characters that define the emoticons. Accordingly, users may easily forget to insert the emoticons in the absence of the cues or may not insert emoticons because they cannot remember or quickly generate the sequence of alphanumeric characters that define the emoticons. As a result, the electronic communication may lack emotional context.

In view of the foregoing, there is a need for continuing efforts to improve communication of emotions with data.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

The embodiments described herein provide methods, graphic user interfaces (GUIs), and systems for communicating emotions with data. In some embodiments, a selection of a graphic image that is configured to convey an emotion is received. As will be explained in more detail below, the graphic image may be selected with a rotatable dial interface. After the graphic image is received, the graphic image is associated with data and the graphic image and the data are displayed together. The display of the graphic image with the associated data provides emotional context to the associated data.

Figure 1:
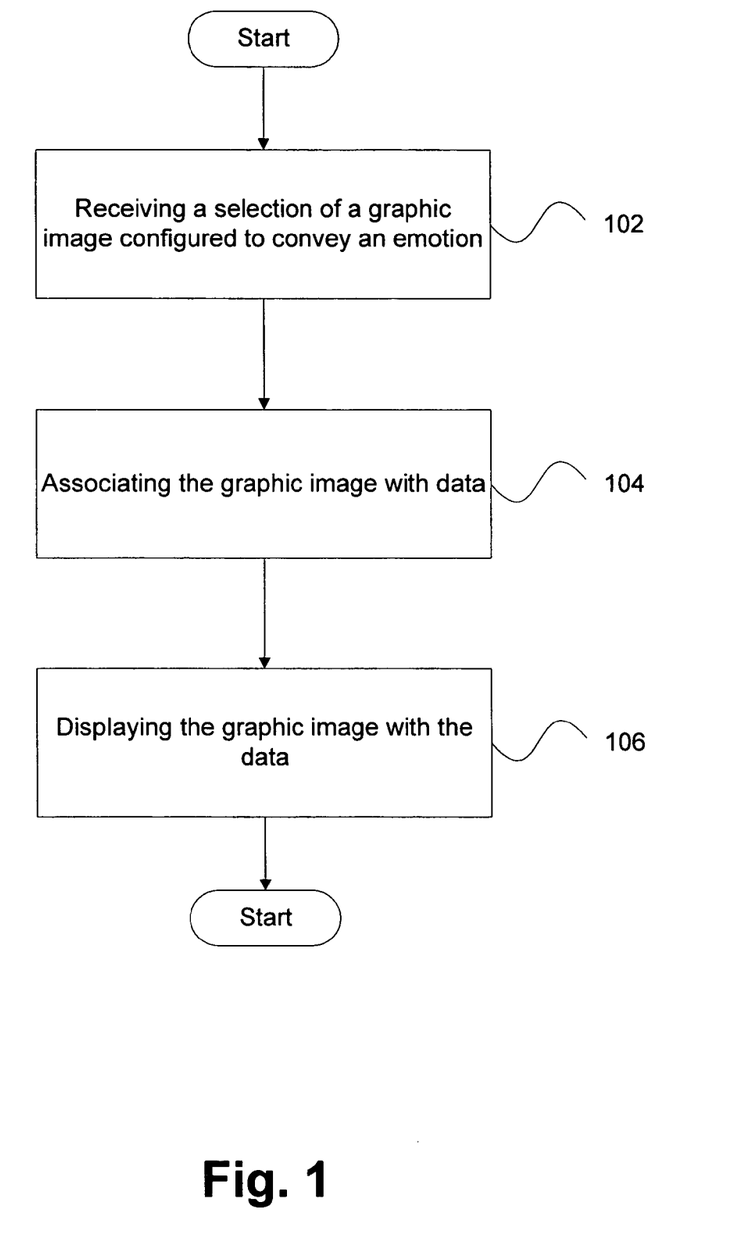
FIG. 1 is a flowchart diagram of a general overview for communicating emotions with data, in accordance with an embodiment.

FIG. 1 is a flowchart diagram of a general overview for communicating emotions with data, in accordance with an embodiment. As shown in FIG. 1, a selection of a graphic image is received in operation 102. The graphic image is configured to convey one or more emotions. In general, it should be appreciated that an emotion is a state of feeling. Examples of emotions include joy, sorrow, reverence, hate, shock, confusion, love, and other emotions. As explained in more detail below, in some embodiments, the graphic image may be selected from multiple graphic images with the use of a rotatable dial interface.

In an embodiment, an application may automatically prompt a user to select at least one graphic image that conveys emotion to be associated with data. For example, the application may automatically present a GUI for a user to select a graphic image after the user types a message. In another embodiment, the application may not automatically prompt the user to select the graphic image. It should be appreciated that the user may select a graphic image to be associated with the data and/or associated with portions of the data. For example, a user may select a graphic image to be associated with an electronic document. In another example, a user may select a graphic image to be associated with each message transmitted in an instant messaging application. In still another example, a user may select a graphic image to be associated with a portion of an image (e.g., a picture). If the user does not select a graphic image to be associated with data, the application may provide a pre-selected graphic image by default to be associated with the data. The selection of a default graphic image by the application may assist the user to remember to include an appropriate graphic image to communicate emotion.

After the selection of the graphic image is received, the graphic image is associated with data in operation 104. The graphic image may be associated with a variety of data. Examples of data include alphanumeric characters, symbols, images, videos, and other data accessible by and/or associated with word processing applications, document viewers, email applications, presentation applications, spreadsheet applications, diagramming applications, graphic editors, graphic viewers, enterprise applications, and other applications. For instance, a type of data that may be associated with a graphic image is the text in an electronic document. Another type of data is the text of a note. A note is a text comment that may be added to a page of text, a document, or a file and is displayed separately from the page of text in an electronic document. A note can be used, for example, to provide feedback on the page of text. After the association, the graphic image is displayed with the data in operation 106 to provide emotional context to the data.

Figure 2:
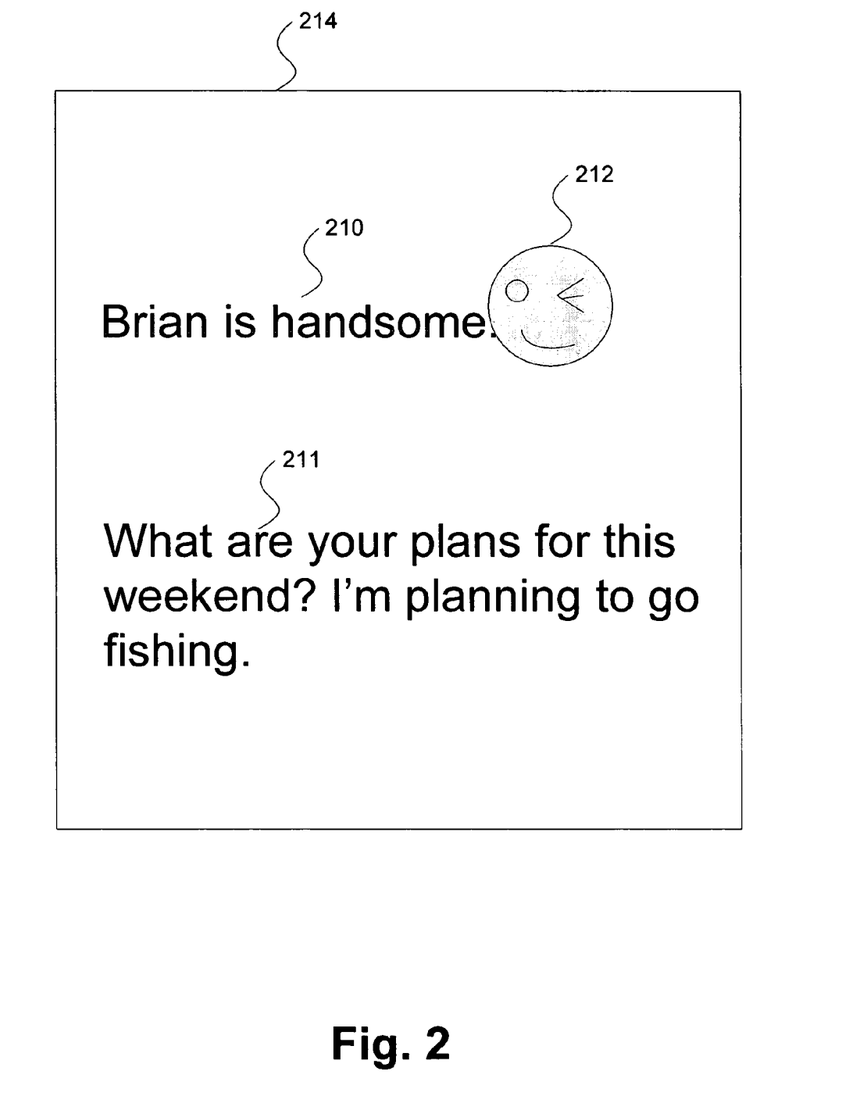
FIG. 2 is a screenshot of an emotion communicated with data, in accordance with an embodiment.

FIG. 2 is a screenshot of an emotion communicated with data, in accordance with an embodiment. As shown in FIG. 2, electronic document 214 includes content (e.g., text sentences 210 and 211) displayed with graphic image 212. Here, graphic image 212 is in the form of a human facial expression that conveys an emotion. A selection of graphic image 212 is received and here, the graphic image is associated with text sentence 210. After association, graphic image 212 is displayed with text sentence 210. Graphic image 212 provides emotional information associated with text sentence 210. For example, graphic image 212 of a human facial expression with a wink and a smile conveys that the message communicated by text sentence 210 is a joke.

As explained in more detail below, the location of graphic image 212 may be used to determine the association with particular portions of the content. In the example of FIG. 2, graphic image 212 is associated with text sentence 210 and not text sentence 211 because the graphic image is located close to text sentence 210. In other words, graphic image 212 is associated with text sentence 210 because the graphic image is located proximate to text sentence 210 and not text sentence 211.

Figure 3:
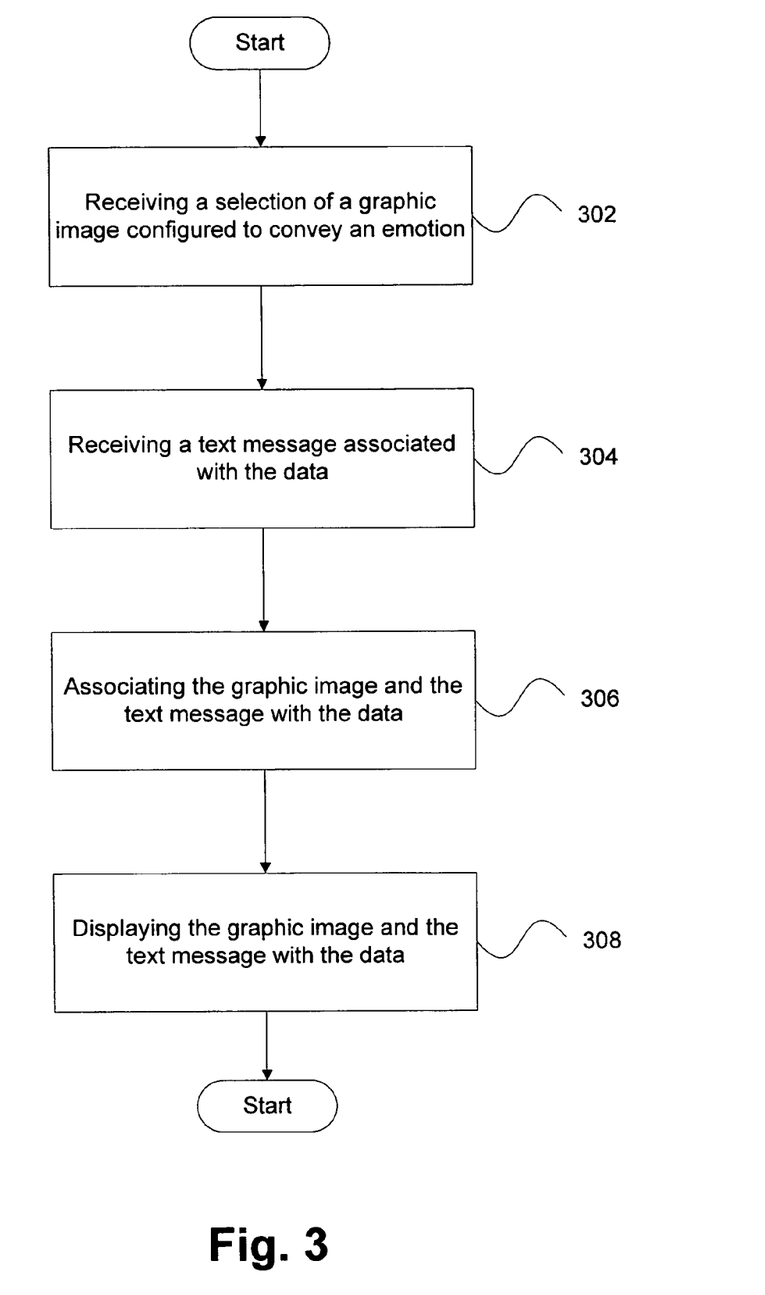
FIG. 3 is a flowchart diagram of a general overview for communicating emotions with data, in accordance with another embodiment.

FIG. 3 is a flowchart diagram of a general overview for communicating emotions with data, in accordance with another embodiment. As shown in FIG. 3, a selection of a graphic image configured to convey an emotion is received in operation 302. In addition, a text message associated with the data is received in operation 304. The text message may be associated with the graphic image when the graphic image is selected. For example, a user may have an option of entering a text message after the user selects a graphic image. After the graphic image and the text message are received, the graphic image and the text message are associated with the data in operation 306. Thereafter, in operation 308, the graphic image and the text message are displayed with the data.

Figure 4:
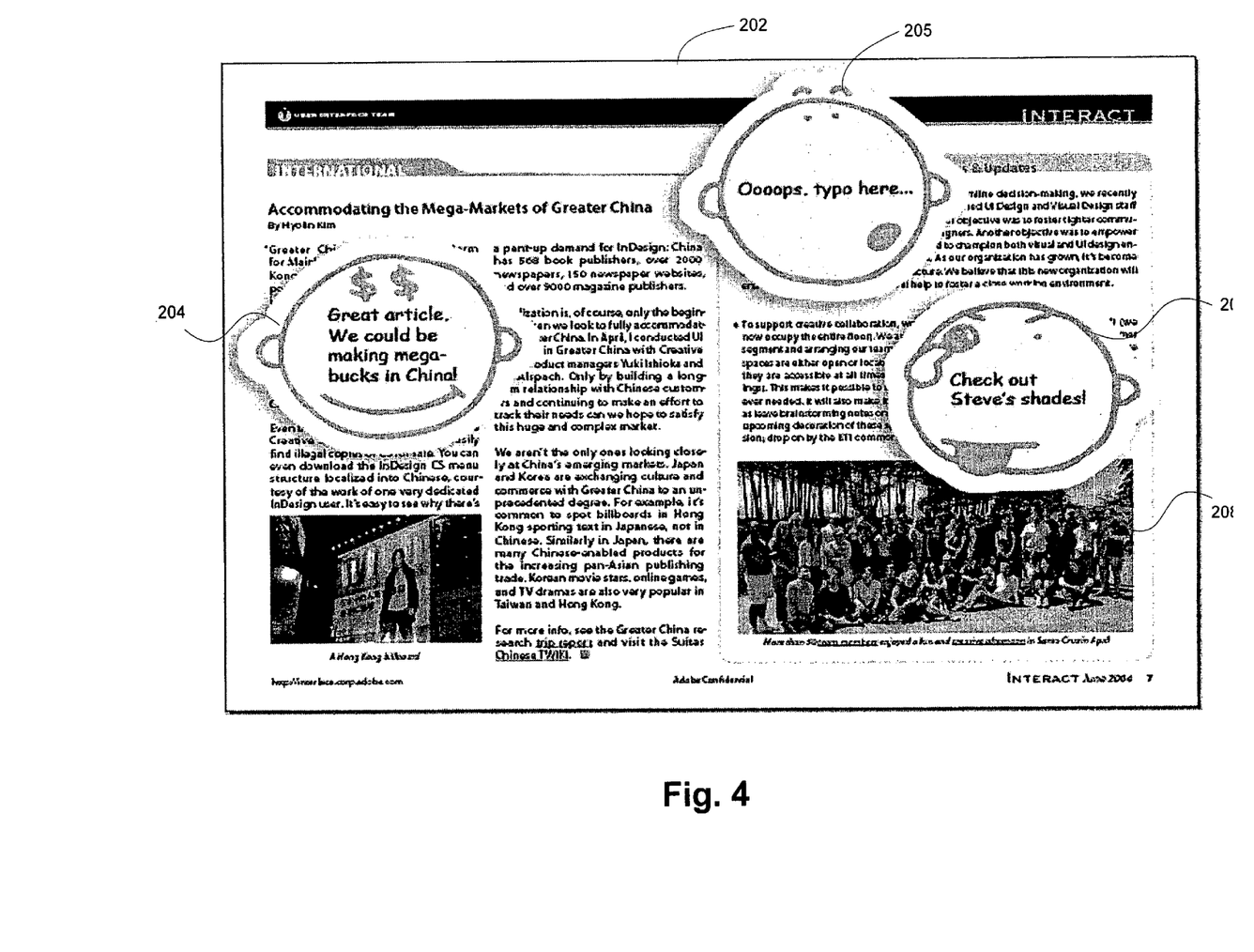
FIG. 4 is a screenshot of emotions and text messages that are communicated with data, in accordance with an embodiment.

FIG. 4 is a screenshot of emotions and text messages that are communicated with data, in accordance with an embodiment. As shown in FIG. 4, electronic document 202 includes content (e.g., texts and images) displayed with graphic images 204-206. In this embodiment, graphic images 204-206 are in the form of human facial expressions that convey emotions. Selections of graphic images 204-206 are received and the graphic images may be associated with the entire electronic document 202 and/or associated with portions of the content. For example, graphic image 204 is configured to convey an emotion in regard to electronic document 202 and graphic images 205 and 206 are configured to convey emotions in regard to portions of the content. Here, a marker associated with the portions of the content (e.g., a markup) that is displayed with the portions of the content can grow out or expand into graphic images 205 and 206. Further, the location of graphic images 205-206 may be used to determine the associations with particular portions of the content. In FIG. 4, graphic image 205, which is located at the upper, right corner of electronic document 202, conveys dismay in regard to the content located at the upper, right corner of the electronic document. Graphic image 206, which is located proximate to image 208, conveys aversion in regard to the image.

In some embodiments, a text message may be associated with each selection of the graphic images 204-206. Here, a selection of a graphic image, such as graphic image 204, 205, or 206, and a text message associated with the graphic image are received. After receipt, the graphic image and the text message are associated with the data. For example, the graphic image and the text message may be associated electronic document 202 and/or portions of the content.

After association, graphic images and the text messages thereafter are displayed within electronic document 202. In an embodiment, the text messages may be displayed inside graphic images 204-206. For example, graphic images 204-206 shown in FIG. 4 are in the form of human facial expressions. Displayed within the human facial expressions are text messages associated with graphic images 204-206. The text messages may be added to provide additional context to graphical images 204-206. In other words, text messages may be added to assist with the interpretation of graphical images 204-206 and/or to provide more details in regard to the associated data. In this example, text message associated with graphic image 204 clarifies that the graphic image is associated with electronic document 202, and not with a portion of the content. The text message associated with graphic image 205 details the location of a typographical error. The text message associated with graphic image 206 brings attention to a particular person within the image.

Figure 5A:
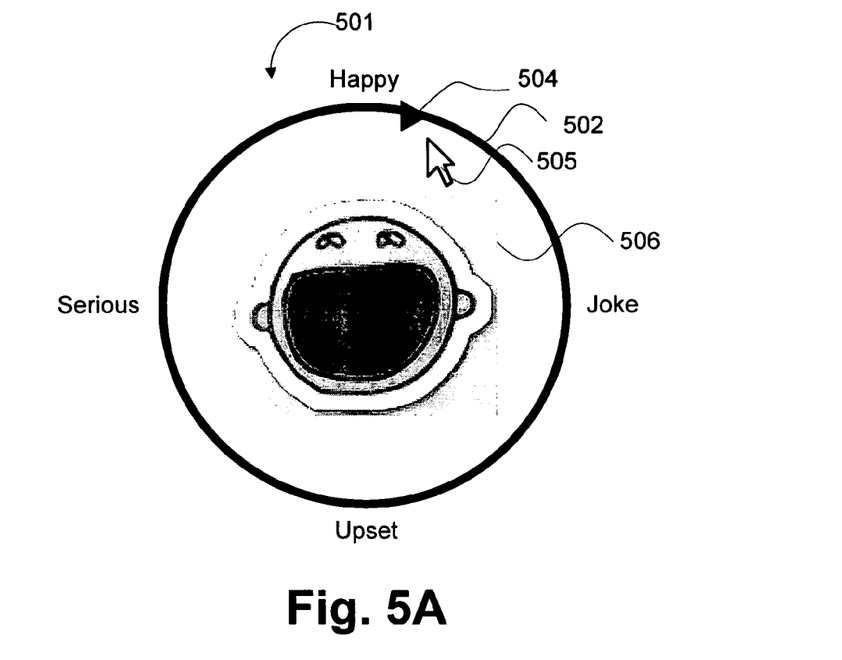
FIGS. 5A-5C are screenshots of graphical user interfaces (GUIs) that may be used to select graphic images, in accordance with various embodiments.
Figure 5B:
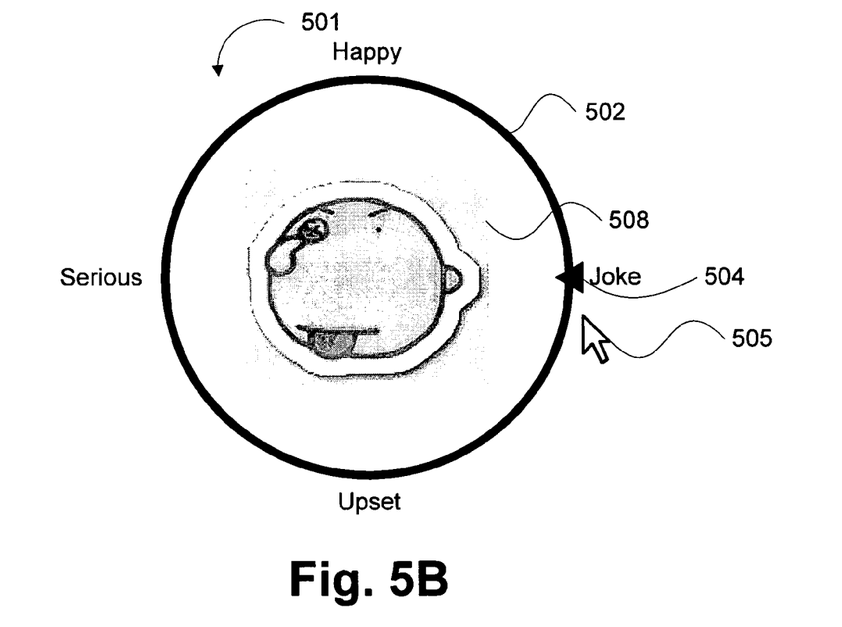
Figure 5C:
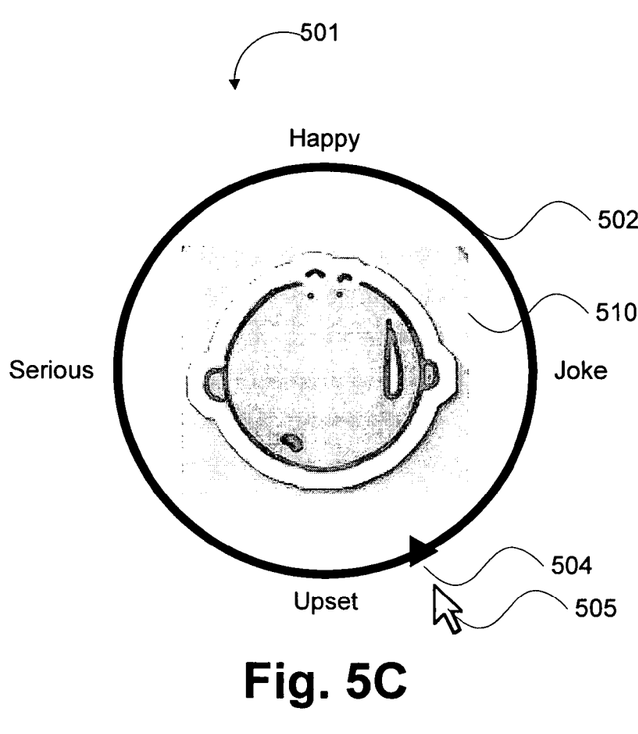

FIGS. 5A-5C are screenshots of graphical user interfaces (GUIs) that may be used to select graphic images, in accordance with various embodiments. As shown in FIG. 5A, GUI 501 includes rotatable dial interface 502 and display 506 of the graphic image. As discussed above, the graphic image is configured to convey an emotion and, in some embodiments, a user may select the emotion by a rotation of rotatable dial interface 502. In other words, a rotation of the rotatable dial interface enables a selection of a graphic image associated with an emotion. Here, the graphic image is a human facial expression associated with the emotion. Graphic image 506 is selected from multiple graphic images and the graphic images (or emotions) are arranged in a circular order. In the embodiment of FIG. 5A, the emotions associated with "happy," "joke," "upset," and "serious" are located at the top, right, bottom, and left, respectively. As explained in more detail below, additional emotions may be selected and the circular order may be based on a relationship between the emotions.

To select a graphic image that conveys an emotion, a user may use a variety of input devices, such as a mouse, to rotate rotatable dial interface 502 in a clockwise or counterclockwise direction. For example, a user may press a mouse button while mouse cursor 505 is over rotatable dial interface 502. With the mouse button pressed, the user may move the mouse in a variety of directions (e.g., right, left, diagonal, and other directions) to rotate rotatable dial interface 502 in a clockwise or counterclockwise direction. To select the graphic image or emotion, the user releases the mouse button at a rotation. Triangular marker 504 shows the position of rotatable dial interface 502. It should be appreciated that a variety of other input devices may be used to select graphic image or rotate rotatable dial interface 502. For instance, a user may use a rotatable dial to select the graphic image. Other examples of input devices include keyboards, scroll wheels, joysticks, touchpads, and/or a variety of other input devices.

In the embodiments of FIGS. 5A-5C, rotatable dial interfaces 502 include displays 506, 508, and 510 of human facial expressions that are associated with the selected emotions. In FIG. 5A, triangular marker 504 is located near the top of rotatable dial interface 502. The top of rotatable dial interface 502 is associated with "happy." As such, display 506 shows a human facial expression that conveys an emotion associated with "happy." In FIG. 5B, triangular marker 504 is located at the right of rotatable dial interface 502. The right of rotatable dial interface 502 is associated with "joke." Accordingly, display 508 shows a human facial expression that conveys an emotion associated with "joke." In FIG. 5C, triangular marker 504 is located near the bottom of rotatable dial interface 502. The bottom of rotatable dial interface is associated with "upset." Thus, display 510 shows human facial expression that conveys an emotion associated with "upset." It should be appreciated that displays 506, 508, and 510 of graphics images to be associated with data may be located at a variety of locations relative to rotatable dial interfaces 502. For example, in the embodiments of FIGS. 5A-5C, displays 506, 508, and 510 are located within rotatable dial interfaces 502. In another example, displays 506, 508, and 510 may be located outside rotatable dial interfaces 502. Displays 506, 508, and 510 displayed with rotatable dial interfaces 502 are optional and thus, in some embodiments, the displays may not be included with the rotatable dial interface.

Figure 6A:
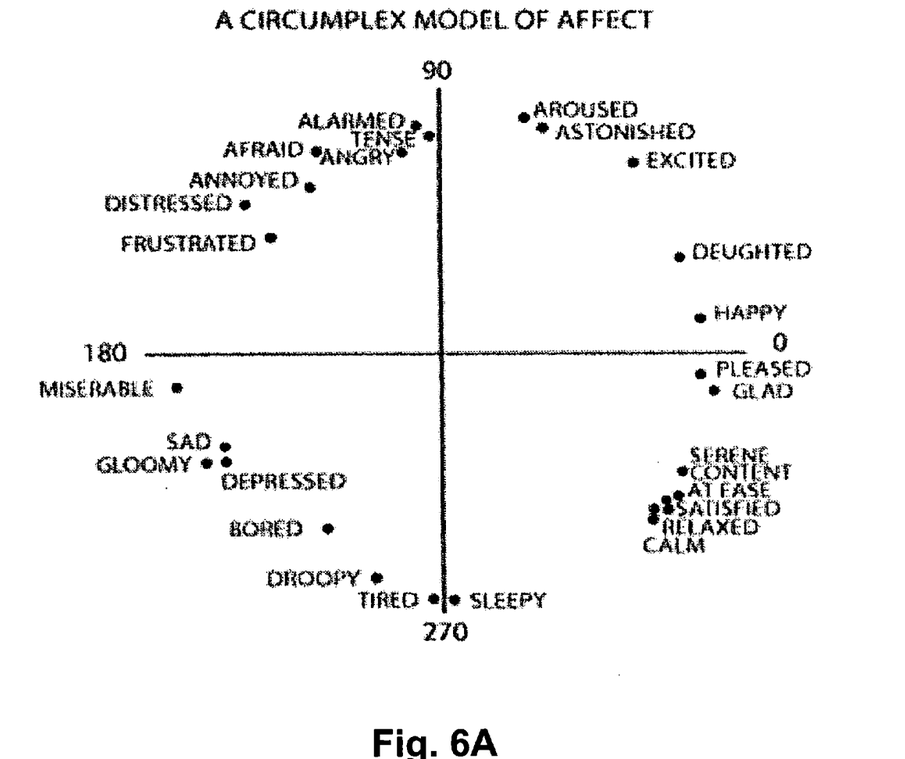
FIG. 6A is a diagram of a circumplex model of affect.

FIG. 6A is a diagram of a circumplex model of affect. Here, emotions are mapped onto the circumplex model of affect. The circumplex model of affect arranges emotions around a circle in two-dimensional space. In some embodiments, the circumplex model of affect arranges emotions in a circular order based on the similarities between the emotions. In the circumplex model of FIG. 6A, the circle represents the degrees of similarities between the emotions. For example, emotions associated with "happy," "pleased," and "glad" are grouped near zero degrees because such emotions are similar. In this embodiment, the emotions are arranged in opposite pairs. Thus, located opposite of "happy," "pleased," and "glad," emotions associated with "miserable," "frustrated," and "sad" are grouped near 180 degrees. Emotions that are located between two emotions are mixtures of the two emotions. For example, located between zero degrees ("happy," "pleased," and "glad") and 270 degrees ("sleepy," "tired," and "droopy") are emotions associated with a mixture of "happy" and "tired," such as "satisfied," "relaxed," "content," and "serene."

Figure 6B:
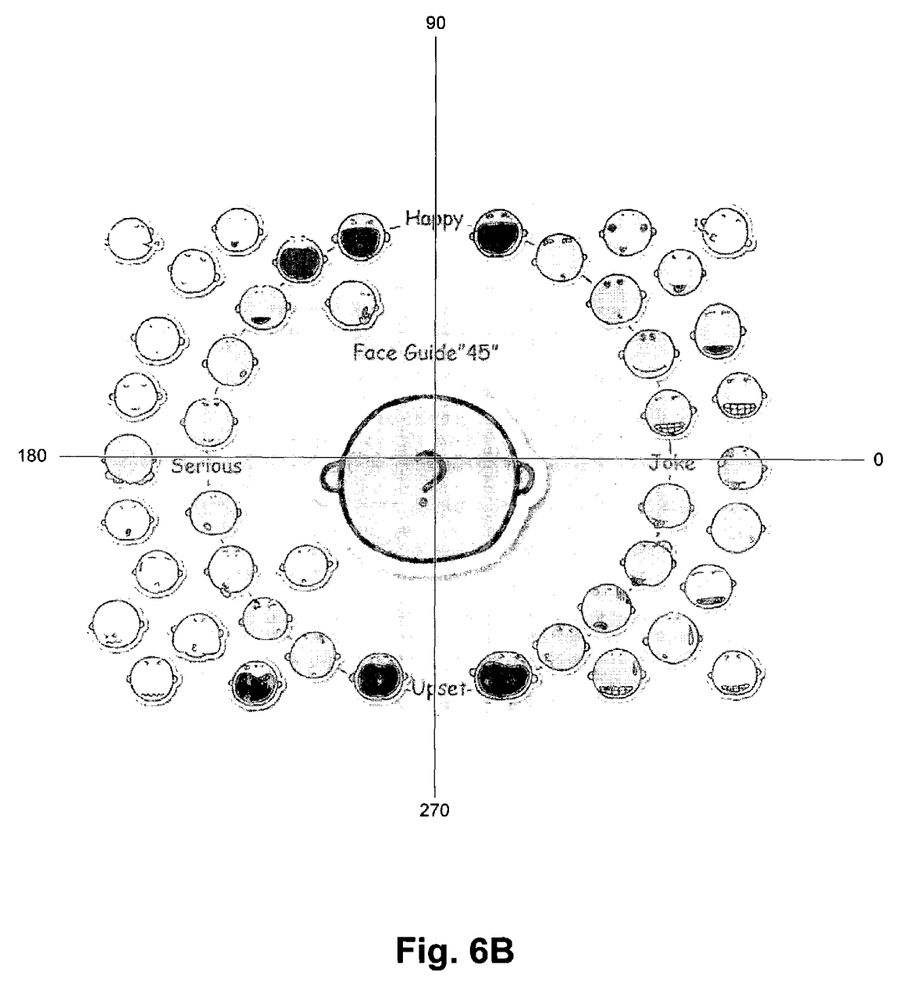
FIG. 6B is a diagram of a GUI based on the circumplex model of affect that may be used to select graphic images, in accordance with an embodiment.

FIG. 6B is a diagram of a GUI based on the circumplex model of affect that may be used to select graphic images, in accordance with an embodiment. FIG. 6B shows graphic images of human facial expressions mapped around a circle in two-dimensional space. The graphic images are arranged in a circular order and the circular order may be based on a relationship between the emotions (or human facial expressions). For example, in an embodiment, each graphic image can correspond to an emotion that is listed in the circumplex model of affect shown in FIG. 6A. Accordingly, the graphic images are arranged in a circular order based on the similarities of the emotions and the circle may represent the degrees of similarities between the emotions.

The circular order of graphic images shown in FIG. 6B may be mapped onto a rotatable dial interface. As a result, each rotation of the rotatable dial interface corresponds to one of the graphic images. A user may manipulate the rotatable dial interface to sequentially advance through a set of expressions/graphic images by advancing a marker. For example, a user may select a human facial expression associated with "happy" by rotating the rotatable dial interface such that a marker associated with the rotatable dial interface points to ninety degrees. The user also may select a human facial expression associated with "serious" by rotating the rotatable dial interface such that the marker associated with the rotatable dial interface points to 180 degrees. In still another example, the user may select a human facial expression associated with a mixture of "serious" and "happy" by rotating the rotatable dial interface such that the marker associated with the rotatable dial interface points to a location between ninety and 180 degrees.

Figure 7:
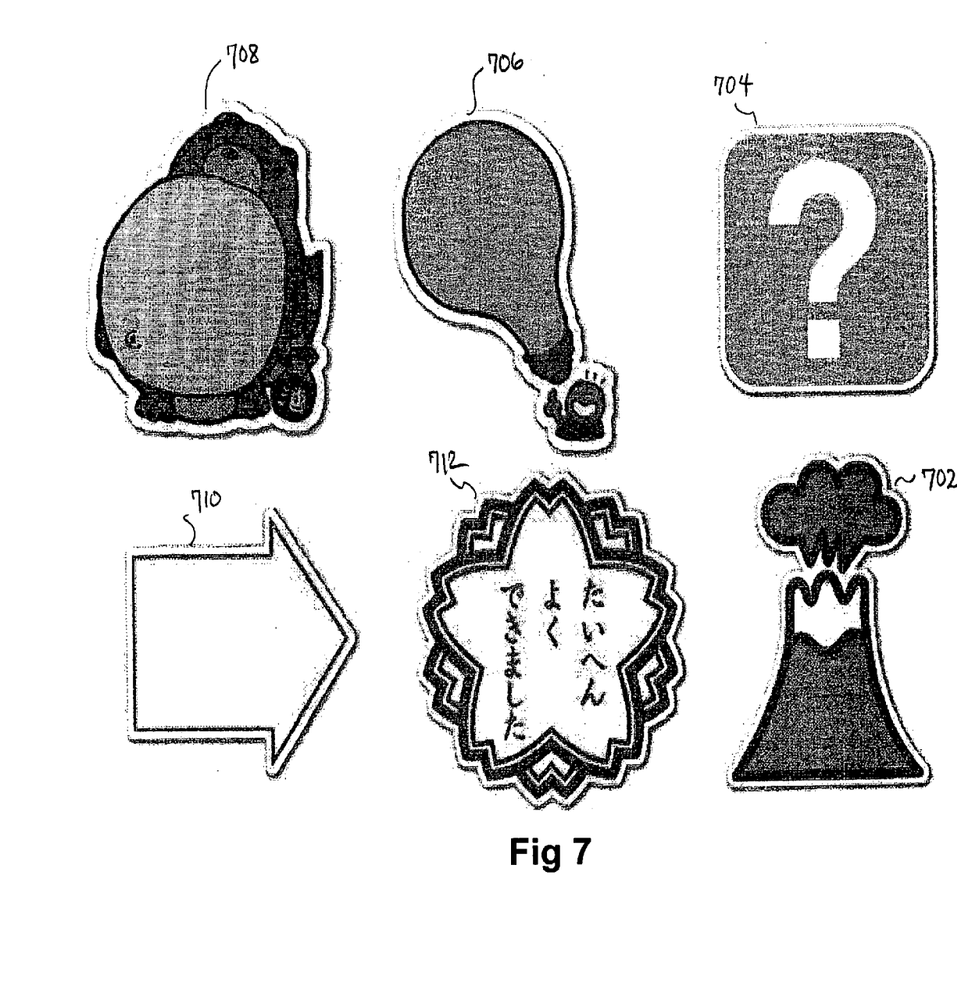
FIG. 7 is an illustration of additional graphic images that convey emotions, in accordance with various embodiments.

FIG. 7 is an illustration of additional graphic images that convey emotions, in accordance with various embodiments. It should be appreciated that in addition to human facial features, a variety of other graphic images may be used to convey emotions. For example, as shown in FIG. 7, graphic image of exploding volcano 702 conveys anger. Graphic image of question mark 704 may be used to convey confusion. Additionally, graphic image of light bulb 706 may be used to convey inspiration and graphic image of bear 708 conveys that the user is inebriated. Further, graphic image of arrow 710 may point to or alert a user to an area with comments and graphic image of pattern 710 with message of "excellent job" in Japanese conveys excitement and satisfaction for a job well done.

It should be appreciated that a variety of suitable layouts can be designed for region layouts illustrated above as FIGS. 2, 4, 5A-5C, 6A-6B, and 7 do not represent all possible layout options available. The displayable appearance of the regions can be defined by a variety of suitable geometric shapes (e.g., rectangle, square, circle, triangle, and other shapes), alphanumeric characters (e.g., A, v, t, Q, 1, 9, 10, and other characters), symbols (e.g., $, *, @, ▼, ☐, ¤, ♥, and other symbols), shadings, patterns (e.g., solid, hatch, stripes, dots, and other patterns), and colors. Furthermore, for example, display 506 of graphic image shown in FIG. 5A, or other regions, may be omitted or dynamically assigned. It should also be noted that the regions can be fixed or customizable. In addition, the computing devices displaying the GUIs may have a fixed set of layouts, utilize a defined protocol or language to define a layout, or an external structure can be reported to the computing device that defines a layout. Further, clicking on a region of GUI as discussed above triggers code to cause the functionality described herein.

Figure 8:
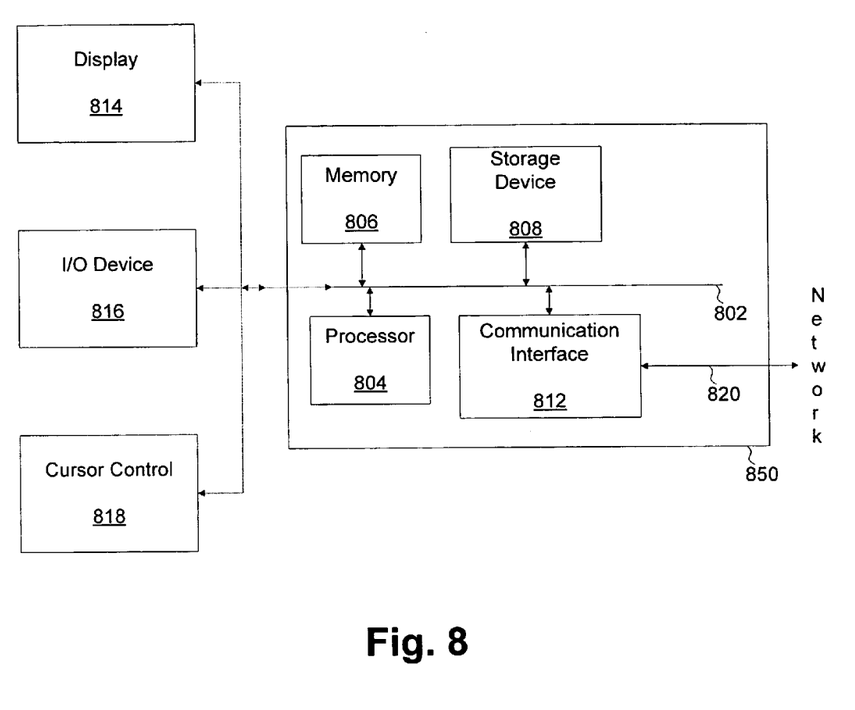
FIG. 8 is a simplified block diagram of an exemplary computing device that is suitable for processing and executing an emotion selection application configured to communicate emotions with data, in accordance with an embodiment.

FIG. 8 is a simplified block diagram of an exemplary computing device that is suitable for processing and executing an emotion selection application configured to communicate emotions with data, in accordance with an embodiment. In some embodiments, computing device 850 may be used to implement computer programs, logic, applications, methods, processes, or other software to communicate emotions with data. Exemplary computing device 850 includes a desktop computer, a server, a portable computing device, a personal digital assistant, a computational engine within an appliance, and other computer systems. As shown in FIG. 8, computing device 850 includes bus 802 or other communication mechanism for communicating information, which interconnects subsystems and devices, such as processor 804, system memory 806 (e.g., random access memory (RAM)), storage device 808 (e.g., read only memory (ROM), magnetic disk drives, optical disk drives, and other storage devices), communication interface 812 (e.g., modem or Ethernet card), display 814 (e.g., cathode ray tube (CRT) or liquid crystal display (LCD)), input/output device 816 (e.g., keyboard), and cursor control 818 (e.g., mouse or trackball).

In some embodiments, computing device 850 performs specific operations by processor 804 when executing one or more sequences of one or more program instructions stored in system memory 806. Such program instructions may be read into system memory 806 from another computer readable medium, such as storage device 808. In some embodiments, hard-wired circuitry may be used in place of or in combination with software program instructions to implement embodiments of the invention.

It should be appreciated that the term "computer readable medium" refers to suitable medium that participates in providing program instructions to processor 804 for execution. Such a medium may take many forms, including but no limited to, non-volatile media, volatile media, and transmission media. Non-volatile media may include for example, optical or magnetic disks, such as storage device 808. Volatile media may include dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications. Common forms of computer readable media includes, for example, magnetic mediums (e.g., floppy disk, flexible disk, hard disk, magnetic tape, and other magnetic mediums), optical mediums (e.g., compact disc read-only memory (CS-ROM) and other optical mediums), physical medium with patterns (e.g., punch cards, paper tape, and other physical mediums), memory chips or cartridges (e.g., RAM, programmable read-only memory (PROM), erasable programmable read-only memory (EPROM), flash memory, and other memory chips or cartridges), carrier waves, and any other medium from which a computer can read.

In some embodiments, execution of the sequences of program instructions to practice the embodiments may be performed by a single computing device 850. In other embodiments, two or more computer systems, such as computing device 850, coupled by communication link 820 (e.g., local area network (LAN), public switched telephone network (PSTN), wireless network, and other communication links) may perform the sequence of program instructions to practice the embodiments in coordination with one another. In addition, computing device 850 may transmit and receive messages, data, and instructions, including program, i.e., application code, through communication link 820 and communication interface 812. Received program instructions may be executed by processor 804 as the program instructions are received, and/or stored in storage device 808, or other non-volatile storage for later execution.

The above-described embodiments provide methods, GUIs, and systems for communicating emotions with data. By using a rotatable dial control to select a graphic image that conveys an emotion, a user can quickly select the graphic image. Further, the arrangement of the emotions (or graphic images) in a circular order provides the user with a large selection of emotions. The arrangement of the graphic images based on a relationship between the emotions additionally provides an intuitive method to select the graphic images.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:

1. A method, comprising:
   displaying a graphical interface comprising a rotatable dial usable to sequentially advance through each one of a plurality of graphic images as the dial is rotated through a plurality of locations, wherein:
      each one of the plurality of graphic images is mapped to one of the plurality of locations according to a circular ordering which arranges the plurality of graphic images around a circle according to degrees of similarity among emotions conveyed by the plurality of graphic images; and
      the graphical interface is configured to display each one of the plurality of graphic images in response to input to position the dial at the one of the plurality of locations to which the one graphic image is mapped;
   in response to receiving input to position the dial at a particular one of the plurality of, displaying the particular graphic image, from among the plurality of graphic images, that is mapped to the particular one of the plurality of locations;
   associating the particular graphic image with a text comment, wherein the particular graphic image and the text comment are both separate from existing content of an electronic document; and
   displaying the particular graphic image, together with the text comment, within the electronic document in a manner indicating the association between the particular graphic image and the text comment.

2. The method of claim 1, wherein the graphic image is selected at least in part by a rotation of the rotatable dial interface.

3. The method of claim 1, wherein the graphic image is a human facial expression associated with the emotion.

4. The method of claim 3, wherein the rotatable dial interface includes a display of the graphical image.

5. The method of claim 1, wherein the rotatable dial interface includes a display of the plurality of graphic images arranged in the circular order.

6. A tangible and non-transitory computer readable storage medium storing program instructions executable by a computer for:
   displaying an existing region of text in an electronic document;
   displaying a graphical interface comprising a rotatable dial usable to sequentially advance through each one of a plurality of graphic images as the dial is rotated through a plurality of locations, wherein:
  each one of the plurality of graphic images is mapped to one of the plurality of locations according to a circular ordering which arranges the plurality of graphic images around a circle according to degrees of similarity among emotions conveyed by the plurality of graphic images; and
  the graphical interface is further usable to display each one of the plurality of graphic images in response to input to position the dial at the one of the plurality of locations to which the one graphic image is mapped;
in response to receiving input to position the dial at a particular one of the plurality of locations, displaying the particular graphic images, from among the plurality of graphic images, that is mapped to the particular one of the plurality of locations;
associating the particular graphic image with a text comment, wherein the particular graphic image and the text comment are both separate from existing content of the electronic document; and
displaying particular the graphic image, together with the text comment, within the electronic document in a manner indicating the association between the particular graphic image and the text comment.

7. The computer-readable storage medium of claim 6, wherein the graphic image is selected at least in part by a rotation of the rotatable dial interface.

8. The computer-readable storage medium of claim 6, wherein the rotatable dial interface includes a display of the expression.

9. A tangible and non-transitory computer-readable storage medium storing program instructions to implement:
  an instant messaging application including a graphical user interface (GUI), comprising:
    a mechanism for receiving a textual message as input from a user of the instant messaging application; and
    graphical interface comprising a rotatable dial usable to sequentially advance through each one of a plurality of graphic images as the dial is rotated through a plurality of locations, wherein:
      each one of the plurality of graphic images is mapped to one of the plurality of locations according to a circular ordering which arranges the plurality of graphic images around a circle according to degrees of similarity among emotions conveyed by the graphic images;
      the graphical interface is configured to display each one of the plurality of graphic images in response to input to position the dial at the one of the plurality of locations to which the one graphic image is mapped; and
      the graphical interface is configured to, in response to receiving input to position the dial at a particular one of the plurality of locations, display the particular graphic image, from among the plurality of graphic images, that is mapped to the particular one of the plurality of locations;
  wherein the instant messaging application is configured to send an indication of the particular graphic image with the textual message to a recipient of the textual message.

10. The computer-readable storage medium of claim 9, wherein the GUI further comprises a display of the graphic image.

11. The computer-readable storage medium of claim 10, wherein the display is located within the rotatable dial interface.

12. The computer-readable storage medium of claim 10, wherein the display is a human facial expression associated with the emotion.

13. A tangible and non-transitory computer-readable storage medium storing program instructions to implement:
  a textual electronic communications application including a graphical user interface (GUI), comprising:
    a mechanism for receiving a textual message as input from a user of the textual electronic communications application;
    a graphical user interface (GUI), comprising a rotatable dial interface usable to sequentially advance through each one of a plurality of graphic images as the dial is rotated through a plurality of locations, wherein:
      each one of the plurality of graphic images is mapped to one of the plurality of locations according to a circular ordering which arranges the plurality of graphic images around a circle according to degrees of the plurality of graphic images similarity among emotions conveyed by the plurality of graphic images;
      the GUI is configured to display each one of the plurality of graphic images in response to input to position the dial at the one of the plurality of locations to which the one graphic image is mapped; and
      the GUI is configured to, in response to receiving input to position the dial at a particular one of the plurality of locations, display the particular graphic image, from among the plurality of graphic images, that is mapped to the particular one of the plurality of locations;
  wherein the textual electronic communications application is configured to send an indication of the particular graphic image with the textual message to a recipient of the textual message.

14. A system, comprising:
  a memory storing a textual electronic communications application comprising an emotion selection interface; and
  a processor in communication with the memory, the processor being configured to execute the textual electronic communications application stored in the memory, the textual electronic communications application comprising program instructions for,
    receiving a textual message for transmission,
    displaying a graphical interface comprising a rotatable dial usable to sequentially advance through each one of a plurality of graphic images as the dial is rotated through a plurality of locations, wherein:
      each one of the plurality of graphic images is mapped to one of the plurality of locations according to a circular ordering which arranges the plurality of graphic images around a circle according to degrees of similarity among emotions conveyed by the plurality of graphic images; and
      the graphical interface is configured to display each one of the plurality of graphic images in response to input to position the dial at the one of the plurality of locations to which the one graphic image is mapped;
    in response to receiving input to position the dial at a particular one of the plurality of locations, displaying the particular graphic image, from among the plurality of graphic images, that is mapped to the particular one of the plurality of locations, associating the particular graphic image with a text comment, wherein the particular graphic image and the text comment are both separate from existing content of an electronic document, and displaying the particular graphic image, together with the text comment, within the electronic document.

* * * * *